Nov. 22, 1955 A. W. MITCHHART Re. 24,093

DRILL BIT FORGING MACHINE

Original Filed April 25, 1949 2 Sheets-Sheet 1

INVENTOR

ALBERT W. MITCHHART

BY Murray A. Gleeson

ATTORNEY

Nov. 22, 1955 A. W. MITCHHART Re. 24,093

DRILL BIT FORGING MACHINE

Original Filed April 25, 1949 2 Sheets-Sheet 2

INVENTOR

ALBERT W. MITCHHART

BY Murray A. Gleason

ATTORNEY

United States Patent Office

Re. 24,093
Reissued Nov. 22, 1955

24,093

DRILL BIT FORGING MACHINE

Albert W. Mitchhart, Tiffin, Ohio, assignor to Goodman Manufacturing Company, Chicago, Ill., a corporation of Illinois Original No. 2,645,138, dated July 14, 1953, Serial No. 89,478, April 25, 1949. Application for reissue September 13, 1954, Serial No. 456,352

17 Claims. (Cl. 76—5)

Matter enclosed in heavy brackets [ ] appears in the original patent but forms no part of this reissue specification; matter printed in italics indicates the additions made by reissue.

This invention relates to machine tools of the air hammer type particularly as used in forging or swedging, and in particular an air compressor actuated hammer for swedging well drill bits and the like against an adjustable anvil and in which the speed and stroke of the hammer are regulated by adjusting air in the compressor through suitable valves.

The purpose of this invention is to provide a forging machine particularly adapted for swedging well drill bits in which greater flexibility of control is provided for regulating the speed and stroke of the hammer.

In the usual type of trip hammer the speed may be controlled by a valve through which compressed air is supplied to the hammer and the stroke may be adjusted by setting cams or other operating levers but for accurate work such as forging or swedging drill bits to exact dimensions it is desired to provide greater flexibility of control. With this thought in mind this invention contemplates a forging machine wherein the hammer is actuated by compressed air in a cylinder in combination with a piston forming a movable cylinder head with the piston forming the cylinder head actuated by an eccentric.

The object of this invention is, therefore, to provide means for mounting and controlling the hammer of a forge whereby the hammer is actuated by impulses imparted to compressed air in a cylinder and in which the pressure and volume of the air in the cylinder are readily adjustable.

Another object of the invention is to provide a forge in which the hammer is actuated by an eccentric in combination with an air compressor wherein an anvil coacting with the hammer is adjustable so that work carried by the anvil may be moved to or from the hammer or set at substantially any angle in relation thereto.

Another object of the invention is to provide means for adjusting the speed and stroke of the hammer of a forge while the hammer is operating.

A further object of the invention is to provide an improved forge for drill bits and the like in which the hammer may be controlled and the drill bit adjusted which is of a comparatively simple and economical construction.

With these and other objects in view the invention embodies a hammer carried on the end of a piston rod with the piston mounted in a cylinder wherein another piston forming the head of the cylinder is actuated by an eccentric, in which air between the pistons is controlled and in which a drill bit or the like is carried by a traveling and pivotally mounted carriage.

Other features and advantages of the invention will appear from the following description taken in connection with the drawings wherein.

Figure 5:
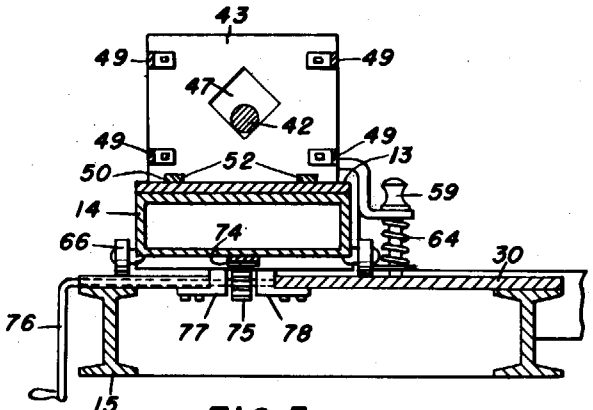
Figure 5 is a cross section taken on line 5—5 of Figure 1 showing the carriage and the mounting therefor and also showing a pinion and rack through which the position of the carriage is adjusted.

Referring now to the drawings wherein like reference characters denote corresponding parts the improved forging machine of this invention includes hammer 10 actuated by air compressor cylinder 11, a motor 12 for imparting impulses to air in the cylinder, a carriage 13 that is pivotally mounted on a base 14 and a platform 15 on which the base and carriage are positioned.

The hammer 10 is carried on the end of a piston rod 16 of a piston 17 that is positioned in the cylinder 11 and the piston rod is slidably mounted in a bearing stand 18 and provided with a spring 19 that forms a resilient bumper for arresting the piston should the work be accidently removed from the path of the hammer.

The cylinder is also provided with another piston 20 that forms a cylinder head and this piston is actuated through a piston rod 21 that is slidably mounted in a bearing 22 and connected through a flexible coupling 23 to a [crank shaft] *pitman* 24, the opposite end of which is carried by a bolt 25 in a slot 26 of a disk 27 on a shaft 28. The bolt 25 is thereby eccentrically mounted on the disk 27 and the disk is rotated by suitable transmission means from the motor or engine 12 which is carried by a stand 29 on a floor or plate 30.

The motor or engine 12 actuates the piston 20 with a reciprocating or vibrating action, the piston being operated through the eccentric and [crank shaft] *pitman* 24 and piston rod 21 and with the valves of the cylinder 11 closed the air between the pistons will drive the piston[s] 17 with the hammer 10 forward and backward with the travel of the piston 20.

The cylinder 11 is provided with a main control valve 31 that is manually actuated by a crank 32 and this valve is connected to an intermediate port 33 of the cylinder through a nipple 34 and a cross connection 35. The cross connection is provided with side connections 36 and 37 and these connections are provided with balancing valves 38 and 39 respectively. The valves 38 and 39 [and] *are* manually actuated to *set the spacing between the pistons 17 and 20 to thereby* adjust the length of the stroke or the distance the [piston 17] *hammer 10* travels *relative to the bit 42, to be described in more detail later.* The connections 36 and 37 are [also] *further* provided with check valves [with a] *40 and 41*, check valve 40 *being* in the connection 36 and [a] check valve 41 *being* in the connection 37. With the valve 31 open, air pushed by the piston 20 is permitted to escape or air may be drawn in so that the piston 17 will remain stationary. With the valve 31 closed, the air compressed by the inward movement of the piston 20 pushes piston 17 to operate the hammer and when the piston 20 starts back it creates vacuum, drawing the piston 17 back. To set the pistons closer together, *and thereby lengthen the stroke or travel of the hammer 10 relative to the bit 42,* the valve 39 is opened which permits air to escape through the check valve 41 and when the piston 17 is adjusted to *provide* the distance or length of travel *of the hammer 10 relative to the bit 42 that is* desired the valve 39 is closed and the pistons 20 and 17 will remain the same distance apart. [When it is desired to] *To set the pistons farther apart and thereby* shorten the length of stroke or travel of the [piston 17] *hammer 10 relative to the bit 42*, the valve 38 is opened which permits air to be drawn in through the check valve 40 as the piston 20 moves backward and when the piston 17 has traveled the desired distance the valve 38 is closed and the [length of travel] *spacing between the pistons 17 and 20* will continue [to the] *as thus* adjusted [stroke]. By shortening the length of travel of the piston 17 the force of the hammer blow or of the die is reduced. By lengthening the distance of travel of the piston 17 the force of the blow of the hammer or die is increased *by permitting it to build up more momentum before striking the bit 42*. The force of the blow of the hammer or die can, therefore, be controlled to any force desired by adjusting the valves *38 and 39*. This force of the hammer or die may also be controlled or adjusted by the valve 31 [as] if this valve is open slightly, allowing air to escape when the piston 20 travels toward the center and allowing the air to be drawn in as the piston travels away from the center it [will be] *is* possible to obtain substantially any force of blow desired. The force is dependent upon the opening provided through the valve 31. With the valve 31 open the piston 17 remains stationary and with the valve closed the piston 17 travels with the piston 20 and by adjusting the opening of the valve 31 the hammer is controlled from the heaviest blow to a light tap or brought to a quick stop, *this being a principal function of the main control valve 31 as normal bit-dressing operations will be carried out with valve 31 closed.*

Figure 4:
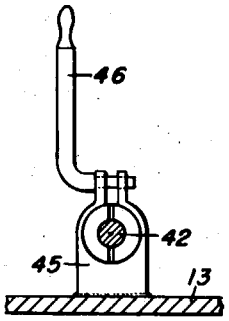
Figure 4 is a cross section taken on line 4—4 of Figure 1 showing a clamp for locking work in the carriage.

In the design shown a drill bit 42, which illustrates the work, is held in position by guides 43 and 44 and maintained in position by a clamp 45 having a crank 46, as illustrated in Figure 4. This clamp may be located at any suitable point and a clamp of any type may be used. The guides [33] *43* and [34] *44* are provided with openings 47 and 48 respectively and the guides are maintained in the position shown by brace bars 49. These guides are slidably mounted on the carriage 13 and the lower edges are provided with slots 50 and 51 respectively which receive guide bars 52 and 53, the ends of which are provided with stops 54 and 55. The carriage 13 is also provided with a bumper or stop 56 having a work engaging element 57 thereon as shown in Figure 1.

Figure 6:
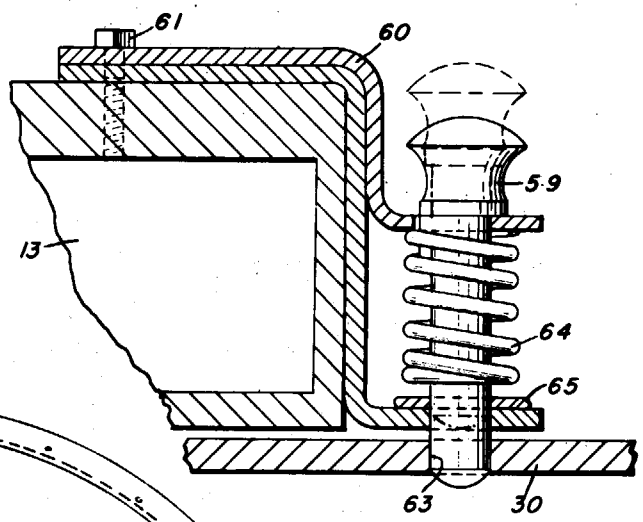
Figure 6 is a detail taken on line 6—6 of Figure 2 showing a locking pin by which the carriage is held in adjusted position.
Figure 2:
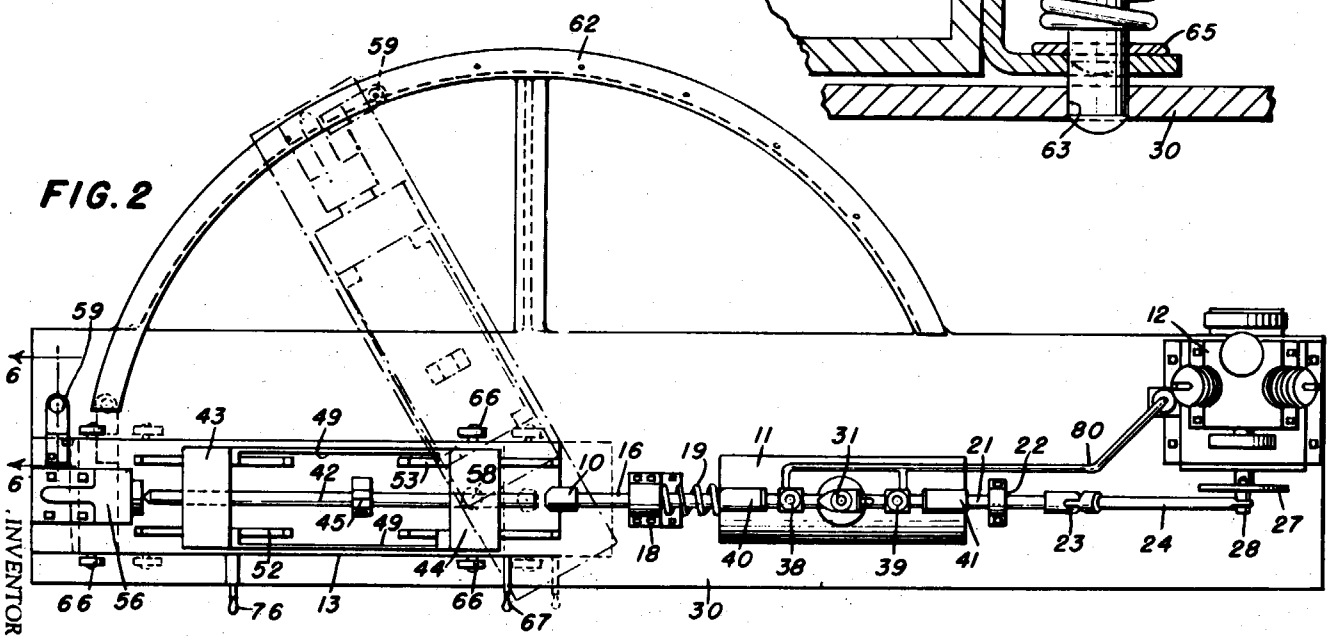
Figure 2 is a plan view of the machine with the work holding carriage illustrated in an adjusted position in dotted lines.

The carriage 13 is pivotally mounted by a pin 58 on the base 14 and may be adjusted to different positions, as illustrated in Figure 2, to adjust the point of a drill bit in relation to the hammer 10 whereby the point of the drill may be hammered to any suitable shape. The hammer may also be replaced by a die so that substantially any curvature or shape desired may be provided on the end of a drill bit or other work. The carriage is maintained in adjusted positions by a spring pin 59, illustrated in Figure 6, wherein the pin is mounted in a bracket 60 secured to the carriage by bolts 61 and positioned whereby the pin follows an arcuate bar 62 which is provided with openings 63 that register with the pin. The pin is urged downwardly with the lower end in one of the openings 63 by a spring 64, the lower ends of which bear against a washer 65 that is secured by welding or other means to the pin.

Figure 3:
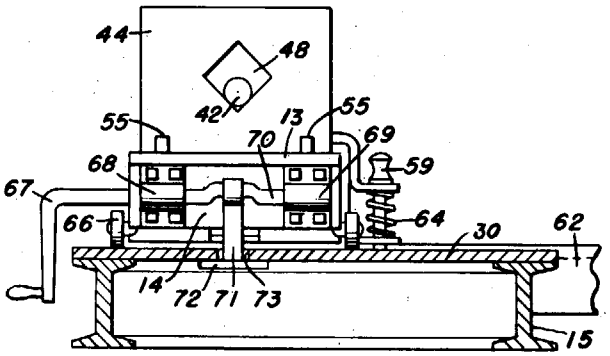
Figure 3 is a cross section through the machine taken on line 3—3 of Figure 1 showing the mounting and locking means of the work holding carriage.

The base 14 is mounted on wheels 66 and the forward end thereof is provided with a crank 67 that is rotatably mounted in bearings 68 and 69, as shown in Figure 3. The intermediate part of the crank is provided with an offset section 70 on which a crank pin 71 with a head 72 on the lower end is carried. The pin 71 extends through a slot 73 in the plate 30 and, thereby provides means for locking the base and carriage in operative position upon the plate or supporting frame. The lower surface of the base 14 is provided with a rack 74 that meshes with a pinion 75 on a crank 76 that is journalled in bearings 77 and 78 of the platform 15 of which the plate 30 forms the upper surface. By this means the base and carriage may be moved toward or away from the hammer to adjust the position of the work or drill bit.

Figure 1:
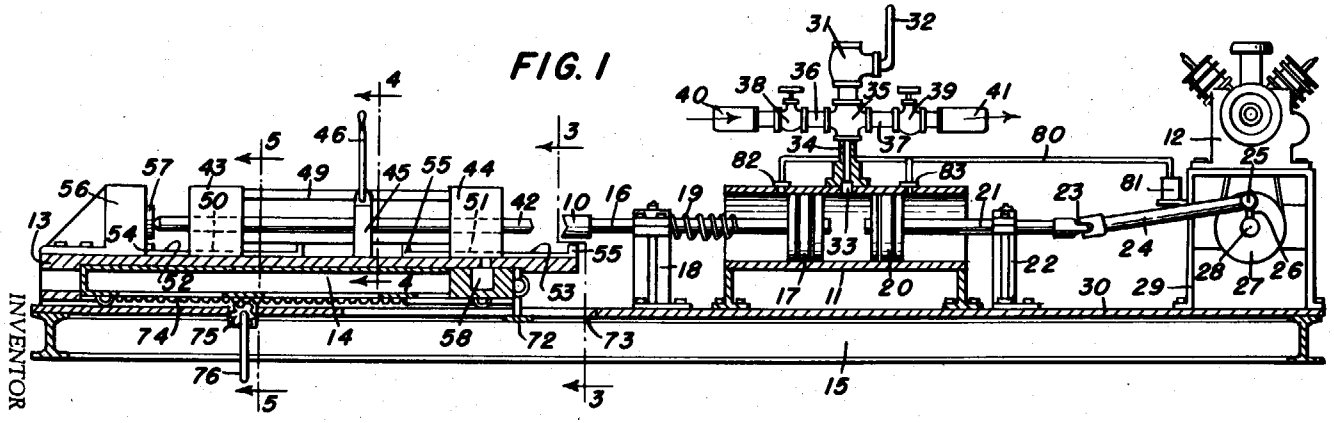
Figure 1 is a longitudinal section through the machine with parts shown in elevation.

In the design shown the cylinder 11 is provided with lubricating means including an oil tube 80 extended from a supply chamber 81 and provided with connections 82 and 83 to the cylinder as shown in Figure 1.

With the parts arranged in this manner a drill bit or other work may be adjusted in relation to the hammer so that the sides of the bit, as well as the end thereof may be forged. Furthermore with the parts arranged in this manner the platform may be set in a horizontal position as shown and may also be set in a vertical position or adjusted to any suitable angle. The anvil or work holding elements may also be raised or lowered by blocking or other means so that the position thereof is adjustable in substantially all directions in relation to the hammer or die.

It will be understood that other modifications may be made in the design and arrangement of the parts without departing from the spirit of the invention.

What is claimed is:

1. A forging tool having a reciprocating hammer, [comprising] an anvil, means pivotally mounting the anvil so that the positions of said anvil can be adjusted in relation to the hammer, a cylinder, a hammer piston in the cylinder having a piston rod on which the hammer is carried, a head piston positioned in the cylinder and having a piston rod extended from the end of the cylinder, an eccentric to which the piston rod of the said head piston is connected, power means for actuating the eccentric, a valve communicating with the intermediate part of the cylinder for controlling the pressure and volume of air in the cylinder between the pistons, balancing valves in communication with the former valve and check valves in communication with the balancing valves for adjusting the stroke and force of the hammer piston, and means for actuating the valve for controlling the pressure and volume of air in the cylinder between the pistons.

2. In a forging tool, the combination which comprises a cylinder, a piston in the cylinder having a piston rod on the outer end of which a die is carried, a head piston in the cylinder having a piston rod extended therefrom, an eccentric, a [crank shaft] *pitman* connecting the piston rod of the head piston to the eccentric, power means for actuating the eccentric, valve means communicating with said cylinder for controlling the volume and pressure of air in the cylinder between the pistons, a work holder positioned in the path of the die carried by the piston rod of the piston in the cylinder, a platform upon which the work holder, cylinder and eccentric are positioned, rack and pinion means moving the work holder toward or away from the die, means pivotally mounting the work holder whereby the work holder may be adjusted to various angular positions in relation to the die, and a spring actuated locking means for securing the work holder in adjusted positions.

3. In a forging tool, the combination which comprises a cylinder, a piston in the cylinder having a piston rod on the outer end of which a die is carried, a head piston in the cylinder having a piston rod extended therefrom, an eccentric, a [crank shaft] *pitman* connecting the piston rod of the head piston to the eccentric, power means for actuating the eccentric, valve means communicating with said cylinder for controlling the volume and pressure of air in the cylinder between the pistons, a work holder positioned in the path of the die carried by the piston rod of the piston in the cylinder, a platform on which the parts are carried, rack and pinion means actuating the work holder toward or away from the die, crank actuated locking means for securing the work holder in adjusted positions to the platform, guide means engaging the work and slidably mounted on said platform for adjusting the position of work in the work holder, and means for clamping the work in adjusted positions in the said work holder.

4. In a forging tool, the combination which comprises a cylinder, a piston in the cylinder having a piston rod on the outer end of which a die is carried, a head piston in the cylinder having a piston rod extended therefrom, an eccentric, a [crank shaft] *pitman* connecting the piston rod of the head piston to the eccentric, power means for actuating the eccentric, valve means communicating with said cylinder for controlling the volume and pressure of air in the cylinder between the pistons, a work holder positioned in the path of the die carried by the piston rod of the piston in the cylinder, a platform on which the parts are carried, rack and pinion means actuating the work holder toward or away from the die, crank actuated means for securing the work holder in adjusted positions on the platform, guide means slidably mounted on the platform and engaging the work for adjusting the position of the work in the work holder, means for clamping the work in adjusted positions in the said work holder, pin means pivotally mounting the platform whereby work may be swung laterally in relation to the die, and spring actuated means for securing the work holder in laterally adjusted positions.

5. In a forging tool, the combination which comprises a cylinder, a piston in the cylinder having a piston rod on the outer end of which a die is carried, a head piston in the cylinder having a piston rod extended therefrom, an eccentric, a [crank shaft] *pitman* connecting the piston rod of the head piston to the eccentric, power means for actuating the eccentric, a manually actuated valve communicating with the interior of the cylinder between the pistons for controlling the passage of air into and out of the cylinder, a work holder positioned in the path of the die carried by the piston rod of the piston in the cylinder, and rack and pinion means adjusting the positions of the said work holder.

6. In a forging tool, the combination which comprises a cylinder, a piston in the cylinder having a piston rod on the outer end of which a die is carried, a head piston in the cylinder having a piston rod extended therefrom, an eccentric, a [crank shaft] *pitman* connecting the piston rod of the head piston to the eccentric, power means for actuating the eccentric, a manually actuated valve communicating with the interior of the cylinder between the pistons for controlling the passage of air into and out of the cylinder, balancing valves in communication with the manually controlled valve for adjusting the stroke and position of the piston on the piston rod of which the die is carried, check valves in communication with the balancing valves, a work holder positioned in the path of the die carried by the piston rod of the piston in the cylinder, and rack and pinion means adjusting the position of the said work holder.

7. In a forging tool, the combination which comprises a cylinder, a piston in the cylinder having a piston rod on the outer end of which a die is carried, a head piston in the cylinder having a piston rod extended therefrom, an eccentric, a [crank shaft] *pitman* connecting the piston rod of the head piston to the eccentric, power means for actuating the eccentric, a manually actuated valve communicating with the interior of the cylinder between the pistons for controlling the passage of air into and out of the cylinder, balancing valves in communication with the manually controlled valve for adjusting the stroke and position of the piston of the piston rod on which the die is carried, a check valve in communication with the balancing valves, a work holder positioned in the path of the die carried by the piston rod of the piston in the cylinder, a carriage on which the work holder is mounted, rack and pinion means for adjusting the carriage longitudinally in relation to the die, pin means for pivotally mounting the carriage whereby said carriage may be swung around laterally to angular positions in relation to the die, crank actuated means for clamping the work holder in adjusted positions, and spring actuated spring means for securing said carriage in adjusted positions.

8. A forging tool having an elongated frame, a motor mounted on the frame, a horizontally disposed cylinder longitudinally positioned on the frame, a tool actuating piston positioned in one end of the cylinder, a motor actuated piston in the opposite end of the cylinder and positioned in opposed relation to the tool actuating piston, means operatively connecting the motor to the said motor actuated piston, a tool actuated by the said tool actuating piston and slidably mounted for horizontal travel on the frame, a work carrying base positioned on the frame, rollers mounting the base on the frame for longitudinal travel in alignment with the axis of the cylinder, a work holding carriage pivotally mounted on the base, guide members engaging the work and clamping the work on the carriage with the work positioned to be acted upon by a tool actuated by the said tool actuating piston, and a crank actuated locking pin for locking the carriage in adjusted position on the base and frame.

9. A forging tool having an elongated frame, a motor mounted on the frame, a horizontally disposed cylinder longitudinally positioned on the frame, a tool actuating piston positioned in one end of the cylinder, a motor actuated piston in the opposite end of the cylinder and positioned in opposed relation to the tool actuating piston, means operatively connecting the motor to the said motor actuated piston, a tool actuated by the said tool actuating piston and slidably mounted for horizontal travel on the frame, a work carrying base positioned on the frame, means mounting the base on the frame for longitudinal travel in alignment with the axis of the cylinder, a work holding carriage pivotally mounted on the base, means clamping work on the carriage with the work positioned to be acted upon by a tool actuated by the said tool actuating piston, a substantially semi-circular track with spaced openings therein extended from one side of the frame with the center thereof positioned on the pivotal mounting of the carriage and a spring pin carried by the carriage and positioned to coact with the spaced openings of the track to retain the carriage in adjusted positions.

10. A forging tool having an elongated frame, a motor mounted on the frame, a horizontally disposed cylinder longitudinally positioned on the frame, a tool actuating piston positioned in one end of the cylinder, a motor actuated piston in the opposite end of the cylinder and positioned in opposed relation to the tool actuating piston, means operatively connecting the motor to the said motor actuated piston, a tool actuated by the said tool actuating piston and slidably mounted for horizontal travel on the frame, a work carrying base positioned on the frame, means mounting the base on the frame for longitudinal travel in alignment with the axis of the cylinder, a work holding carriage pivotally mounted on the base, means clamping work on the carriage with the work positioned to be acted upon by a tool actuated by the said tool actuating piston, a substantially semi-circular track with spaced openings therein extended from one side of the frame with the center thereof positioned on the pivotal mounting of the carriage, a spring pin carried by the carriage and positioned to coact with the spaced openings of the track to retain the carriage in adjusted position, a rack carried by the base, and a crank actuated pinion journaled in the frame and positioned to coact with the rack for adjusting the position of the base and carriage in relation to the tool.

*11. A forging tool having a reciprocating hammer, an anvil, means mounting the anvil so that the positions of said anvil can be adjusted in relation to the hammer, a cylinder, a hammer piston in the cylinder having a piston rod on which the hammer is carried, a head piston positioned in the cylinder and having a piston rod extended from the end of the cylinder, an eccentric to which the piston rod of the said head piston is connected, power*

*means for actuating the eccentric, a valve communicating with the intermediate part of the cylinder for controlling the pressure and volume of air in the cylinder between the pistons, balancing valves in communication with the former valve and check valves in communication with the balancing valves for adjusting the stroke and force of the hammer piston, and means for actuating the valve for controlling the pressure and volume of air in the cylinder between the pistons.*

*12. A forging tool having a reciprocating hammer, an anvil, means mounting the anvil so that the positions of said anvil can be adjusted in relation to the hammer, a cylinder, a hammer piston in the cylinder having a piston rod on which the hammer is carried, a head piston positioned in the cylinder and having a piston rod extended from the end of the cylinder, an eccentric to which the piston rod of the said head piston is connected, power means for actuating the eccentric, a valve communicating with the intermediate part of the cylinder for controlling the pressure and volume of air in the cylinder between the pistons, balancing valves in communication with the intermediate part of the cylinder and inlet and outlet check valves in communication with the balancing valves for adjusting the stroke and force of the hammer piston, and means for actuating the first-mentioned valve for controlling the pressure and volume of air in the cylinder between the pistons.*

*13. A forging tool having a reciprocating hammer, an anvil, means mounting the anvil so that the positions of said anvil can be adjusted in relation to the hammer, a cylinder, a hammer piston in the cylinder having a piston rod on which the hammer is carried, a head piston positioned in the cylinder and having a piston rod extended from the end of the cylinder, an eccentric to which the piston rod of the said head piston is connected, power means for actuating the eccentric, a valve communicating with the intermediate part of the cylinder for controlling the pressure and volume of air in the cylinder between the pistons, balancing valves in communication with the intermediate part of the cylinder and inlet and outlet check valves in communication respectively with and controlled by the balancing valves for adjusting the stroke and force of the hammer piston, and means for actuating the first-mentioned valve for controlling the pressure and volume of air in the cylinder between the pistons.*

*14. A forging tool having a reciprocating hammer, an anvil, means mounting the anvil so that the positions of said anvil can be adjusted in relation to the hammer, a cylinder, a hammer piston in the cylinder having a piston rod on which the hammer is carried, a head piston positioned in the cylinder and having a piston rod extended from the end of the cylinder, power means for reciprocating the head piston, balancing valve means for adjusting the stroke and force of the hammer piston, comprising a pair of selectively operable valves in communication with the cylinder intermediate its ends, one having an inlet check valve associated therewith, the other having an outlet check valve associated therewith, and means associated with said balancing valve means for controlling the pressure and volume of fluid in said cylinder.*

*15. A forging tool having a reciprocating hammer, an anvil, means mounting the anvil so that the positions of said anvil can be adjusted in relation to the hammer, a*

*cylinder, a hammer piston in the cylinder having a piston rod extending from one end of the cylinder on which the hammer is carried, a head piston positioned in the cylinder and having a piston rod extended from the other end of the cylinder, power means for actuating the head piston, a pair of conduits each communicating with the intermediate part of the cylinder and each having a check valve therein, one permitting flow into the cylinder, the other permitting flow out of the cylinder, and control valves, one for each check valve, in said conduits for selectively controlling the starting and stopping of flow through said check valves for adjusting the stroke of the hammer piston, control means in said conduits for regulating the volume and pressure in said cylinder.*

*16. A pneumatic percussion tool having a reciprocating percussion tool holder, a cylinder, a working piston at one end of the cylinder and connected to the tool holder, a compressor piston at the other end of the cylinder having a piston rod extending from the cylinder, means for reciprocating the compressor piston, conduit means connected to the cylinder intermediate its ends, balancing valve means in said conduit means for adjusting the stroke and force of the working piston, comprising a pair of selectively operable valves, an inlet check valve associated with one of the pair of valves and an outlet check valve associated with the other valve, and valve means in said conduit means for controlling the volume and pressure within the cylinder.*

*17. A forging tool having a hammer, an anvil, cylinder means, a hammer piston in the cylinder means having a piston rod on which the hammer is carried, a head piston positioned in the cylinder means and having a piston rod extended from the end of the cylinder means. an eccentric to which the piston rod of the said head piston is connected, power means for actuating the eccentric, a valve communicating with the intermediate part of the cylinder means for controlling the pressure and volume of air in the cylinder means between the pistons, balancing valves in communication with the former valve and check valves in communication with the balancing valves adjusting the stroke and force of the hammer piston, and means for actuating the valve for controlling the pressure and volume of air in the cylinder means between the pistons.*

References Cited in the file of this patent or the original patent

UNITED STATES PATENTS

| | | |
|---|---|---|
| 68,888 | Lamson | Sept. 17, 1867 |
| 337,728 | Arns | Mar. 9, 1886 |
| 678,300 | Krause | July 9, 1901 |
| 834,441 | Adams | Oct. 30, 1906 |
| 915,362 | Krause | Mar. 16, 1909 |
| 1,072,358 | Palmros | Sept. 2, 1913 |
| 1,082,580 | Bates | Dec. 30, 1913 |
| 1,085,978 | Gibson | Feb. 3, 1914 |
| 1,389,501 | Gorman et al. | Aug. 30, 1921 |
| 2,063,043 | McKesson | Dec. 8, 1936 |
| 2,091,408 | Lewis | Aug. 31, 1937 |

FOREIGN PATENTS

| | | |
|---|---|---|
| 93,635 | Switzerland | Sept. 3, 1920 |
| 424,510 | France | May 16, 1911 |